(12) United States Patent
Perelman et al.

(10) Patent No.: US 7,971,135 B2
(45) Date of Patent: Jun. 28, 2011

(54) METHOD AND SYSTEM FOR AUTOMATIC DATA AGGREGATION

(75) Inventors: Roberto Perelman, Sunnyvale, CA (US); Yuan Sheng Fu, Sunnyvale, CA (US); Heather Winkle, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 269 days.

(21) Appl. No.: 11/495,832

(22) Filed: Jul. 28, 2006

(65) Prior Publication Data

US 2008/0028332 A1 Jan. 31, 2008

(51) Int. Cl.
*G06F 17/00* (2006.01)
(52) U.S. Cl. ........................... 715/224; 715/234
(58) Field of Classification Search ................... 715/224, 715/234
See application file for complete search history.

(56) References Cited

U.S. PATENT DOCUMENTS

| 7,062,706 | B2 | 6/2006 | Maxwell et al. | |
|---|---|---|---|---|
| 7,500,178 | B1 | 3/2009 | O'Donnell | |
| 7,870,477 | B2 | 1/2011 | Perelman et al. | |
| 2002/0125713 | A1 | 9/2002 | Raab | |
| 2003/0055723 | A1* | 3/2003 | English | 705/14 |
| 2005/0251733 | A1 | 11/2005 | Elkady | |
| 2006/0138236 | A1 | 6/2006 | Hepworth et al. | |
| 2006/0179003 | A1* | 8/2006 | Steele et al. | 705/59 |
| 2007/0055596 | A1* | 3/2007 | Yankovich et al. | 705/35 |
| 2007/0198478 | A1* | 8/2007 | Yu et al. | 707/3 |
| 2008/0028333 | A1 | 1/2008 | Perelman et al. | |

FOREIGN PATENT DOCUMENTS

| WO | WO-2008013855 A2 | 1/2008 |
|---|---|---|
| WO | WO-2008013889 A2 | 1/2008 |

OTHER PUBLICATIONS

"U.S. Appl. No. 11/495,833, Non-Final Office Action mailed Mar. 17, 2010", 10.
"U.S. Appl. No. 11/495,833, Response filed Jun. 17, 2010 to Non Final Office Action mailed Mar. 17, 2010".
"International Application Serial No. PCT/US07/16734 Written Opinion mailed Jul. 21, 2008", 6 pgs.
"International Application Serial No. PCT/US07/16798, International Search Report mailed May 1, 2008", 4 pgs.
"International Application Serial No. PCT/US07/16798, Written Opinion mailed May 1, 2008", 7 pgs.
Lynch, Jerome Peter, et al., "Embedding damage detection algorithms in a wireless sensing unit for operational power efficiency", *In smart materials and structures*; vol. 13(4), (Aug. 2004), 800-810.
"U.S. Appl. No. 11/495,833, Notice of Allowance mailed Sep. 3, 2010", 9 pgs.
"U.S. Appl. No. 11/495,833, Supplemental Notice of Allowability mailed Sep. 23, 2010", 6 pgs.

* cited by examiner

*Primary Examiner* — Laurie Ries
(74) *Attorney, Agent, or Firm* — Schwegman, Lundberg & Woessner, P.A.

(57) ABSTRACT

A system, for automatic data aggregation, may include a communications module to access an electronic form, a detector to detect a workflow indication associated with the electronic form. The system further comprises an aggregator. The aggregator may be configured to associate electronic form data with an aggregate package in response to the detected workflow indication. The electronic form data may be presented in the aggregate package as a separate record.

22 Claims, 7 Drawing Sheets

| AGGREGATED FORM | | | | | | |
|---|---|---|---|---|---|---|
| ID | NAME | STREET ADDRESS | CITY | STATE | ZIP | DAYTIME PHONE |
| 001 | BENJAMIN MARTIN | 19121 EVELYN AVENUE | SUNNYVALE | CA | 94086 | 408-376-5400 |
| ... | ... | ... | ... | ... | ... | ... |
| ... | ... | ... | ... | ... | ... | ... |
| 00N | ... | ... | ... | ... | ... | ... |

METHOD AND SYSTEM FOR AUTOMATIC DATA AGGREGATION

TECHNICAL FIELD

This application relates to a method and system for automatic data aggregation.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Portable Document Format (PDF) is a standard for a secure and reliable distribution and exchange of electronic documents and forms. PDF is a file format that preserves fonts, images, graphics, and layout of a source document, regardless of the application and platform used to create it. Adobe® PDF files are compact and complete, and can be shared, viewed, and printed by anyone with free Adobe Reader® software.

The data contained in several homogenous PDF forms may be aggregated by exporting it to a spreadsheet. For example, a separate row in a spreadsheet may store the field's values of the original PDF form. A separate column may store values associated with a particular field of the original PDF forms. The data from several PDF forms may also be exported into a database, where a database record may represent a separate PDF form.

In order to aggregate data from a plurality of PDF forms into a spreadsheet or to import it into a database, a user may need to first make a determination of whether any given electronic form contains data that is appropriate for being transferred into a target spreadsheet or a target database file.

BRIEF DESCRIPTION OF DRAWINGS

Embodiments are illustrated by way of example and not limitation in the figures of the accompanying drawings, in which like references indicate similar elements and in which:

FIG. 6 illustrates a summary sheet, in accordance with an example embodiment.

DETAILED DESCRIPTION

Figure 1:
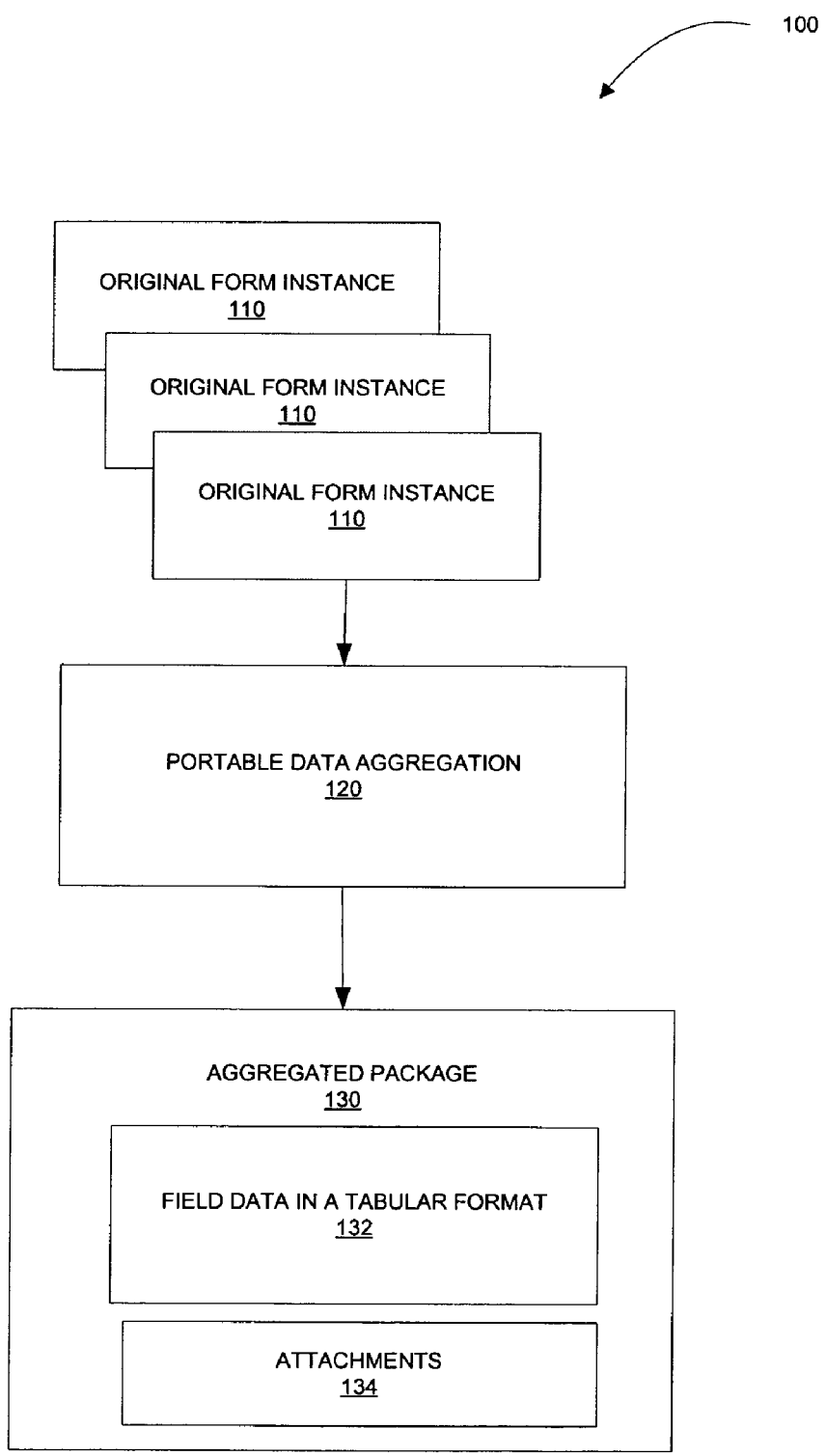
FIG. 1 is a block diagram showing an architecture within which a method and system to aggregate data from several electronic forms into a portable format may be implemented, in accordance with an example embodiment.

In an example embodiment, a method and system are provided to aggregate data from several original electronic forms (e.g., several instances of an original electronic form) into a single file container. It will be noted, that, for the purposes of this description, the terms "form" and "electronic form" may be used interchangeably. The resulting aggregate package (e.g., a single PDF file or a plurality of associated files) may include an aggregate representation of field data associated with the several original electronic forms, such that field data associated with one electronic form is presented to a viewer as one record, e.g., in a tabular format. The aggregate representation of field data associated with the several original electronic forms may be in a form of a summary sheet. Furthermore, the visually rich representation of an original electronic form may be preserved by saving characterizations of the original electronic form as part of the aggregate package. In one example embodiment, where an aggregate package is a PDF file, the characterizations of an original electronic form may be saved as an attachment associated with the PDF file.

In an example embodiment, a workflow of an electronic form begins by an "initiator" (e.g., a person or an automated process) sending an original electronic form (e.g., a blank electronic form) to people who need to fill it out. The original electronic form may include information indicating that all instances of the original electronic form are associated with a particular workflow. In one example embodiment, such an indication may be represented by metadata associated with an electronic form. When each filled-in original form instance is returned to the initiator and opened utilizing an associated viewer application, the metadata may be discovered and the user may be prompted to indicate whether this form instance should be added to an aggregate package. An example aggregate package, sometimes referred to as a dataset or an aggregate dataset, may include a container file that serves as a container for each of the aggregated form instances, which may be inserted as attachments. An initiator may be provided with a visual display that shows a tabulated view of all form instances in the dataset, e.g., a tabulated view or a list view. A user may be permitted to open an original form instance for inspection from within the tabulated view by performing a predetermined control action. A control action may be, for example, a user action such as a single or a double click on a row representing field data of a particular instance of the original form. In an example embodiment, a control button may be provided to permit a user to view a form instance associated with a selected row. A user may also be permitted to remove any form instance from the dataset by deleting the corresponding attachment.

Thus, the system, in an example embodiment, may be configured to aggregate data associated with various collected instances of the original form and to render the aggregated form data in a tabular format (or some other format) or in an aggregated or collected manner, and also to permit a user to view a selected instance of the original form in its original visually rich format. Furthermore, the system may be configured to permit a user to remove a particular instance of the original form from the aggregate package, such that its form field data presented in an aggregated or collected manner, as well as the associated instance of the original form, are removed from the aggregate package. In an example embodiment, the view and remove operations may be performed in a drag and drop manner. An example architecture of a system to aggregate data is illustrated in FIG. 1.

FIG. 1 shows an architecture 100, within which a method and system to aggregate data from several electronic forms into a portable format may be implemented, in accordance with an example embodiment. In the context of the architecture 100, in an example embodiment, multiple instances 110 of an original electronic form are received and processed by a portable aggregation logic 120. The portable aggregation logic 120 may be configured to access an original form 110 and detect that the original form 110 includes an associated workflow metadata indicating that the original form 110 may be aggregated with other forms or form instances associated with the same workflow. Workflow metadata, in one embodiment, may include a workflow identifier so as to enable association of the form with a workflow description. The portable aggregation logic 120 may also be configured to determine a location of an existing aggregate package 130 associated with the workflow and selectively add the form data into the aggregate package 130. It will be noted that in an example embodiment, portable aggregation logic 120 may be configured to determine that a target aggregate package for a particular workflow does not exist and, in response to this determination, generate a target aggregate package (e.g., aggregate package 130).

Thus, the processing by the portable aggregation logic 120, in an example embodiment, may result in a newly generated aggregate package 130 or in an aggregate package 130, where data associated with one or more original forms 110 has been selectively added. The aggregate package 130, in an example embodiment, comprises field data 132 obtained from one or more original forms 110. The field data in the aggregate package 130 may be presented to a user in a tabular format, e.g., where a particular row corresponds to field data from a particular original form 110. In an example embodiment, where the forms 110 are different instances of a single original form, a particular column in the tabular representation of form field data in the aggregate package may correspond to values associated with a particular field in the original form.

The aggregate package 130, in an example embodiment, further comprises original forms 110 saved as attachments 134. A system for portable data aggregation may be configured, in an example embodiment, to receive a control action associated with a row in a tabular representation corresponding to a particular original form or a particular original form instance. The system may then display a representation of the associated original form in a visually rich original format. A control action may be, for example, a click, an actuating of a control button, etc.

It will be noted that, as mentioned above, the portable data aggregation 120 may be performed on a multiple instances of a particular original form, as well as on a plurality of heterogeneous electronic forms, where different electronic forms received by the portable data aggregation logic 120 may have different form fields, different presentation characteristics, as well as different form field values. An example system to aggregate data from a plurality of electronic form instances is described with reference to FIG. 2.

Figure 2:
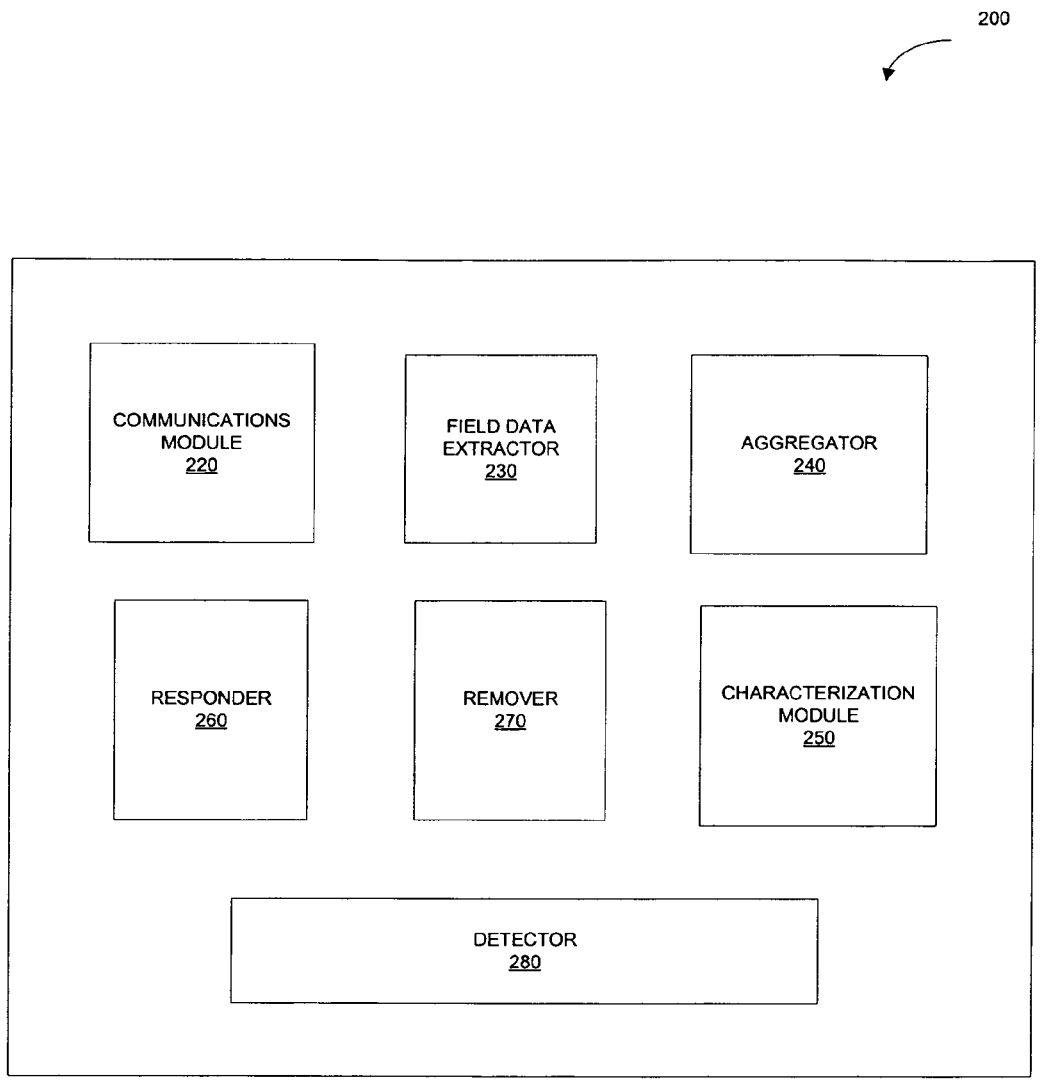
FIG. 2 is a block diagram illustrating a system, in accordance with an example embodiment, to aggregate a set of collected electronic forms into one aggregate package.

FIG. 2 shows a block diagram illustrating a system 200, in accordance with an example embodiment, to aggregate a set of collected electronic forms into one aggregate package. The system 200, in an example embodiment, comprises a communications module 220, a field data extractor 230, an aggregator 240 and a characterization module 250. The communications module 220 may be configured to receive multiple electronic forms. The received electronic forms may be, in one example embodiment, multiple instances of an original electronic form. In another example embodiment, the received forms may be instances of different electronic forms.

The communications module 220 may be configured to cooperate with the field data extractor 230, which, in turn, may be configured to extract field data from each one of the received electronic forms and to provide the extracted data to the aggregator 240. The aggregator 240 may be configured to add the extracted field data into an aggregate package. The aggregator 240 may also be configured to generate a tabular representation of the extracted field data.

The characterization module 250 may be configured to add, into an aggregate package, a characterization of a form received by the communications module 220 and added by the aggregator 240. In one example embodiment, the characterization of a form received by the communications module 220 may be added into an aggregate package by saving the received electronic form as an attachment associated the aggregate package. In another embodiment, the characterization may be associated with an aggregate package, for example by association data included within the application package which points to a storage location at which the characterization is stored. The saved characterization of a form may be utilized to preserve visual presentation of the received electronic form.

The system 200, in an example embodiment, may further include a responder 260 and a remover 270. The responder 260 may be configured to permit viewing of an original representation of a received form from the aggregate package. The remover 270 may be configured to permit removing all representations of a particular electronic form from the aggregate package.

As mentioned above, a system for portable data aggregation may be configured to detect metadata within an electronic form indicating that the electronic form is associated with a particular workflow. Thus, the system 200 may include a detector 280 to detect automatically that an electronic form is part of a particular workflow. In one example embodiment, the detector 280 may be configured to perform the detecting of whether an electronic form is part of a particular workflow after the electronic form is opened for viewing by an associated application. In an alternative embodiment, the detector 280 may be configured to periodically scan a predetermined destination (e.g., a particular folder or directory, an inbox associated with initiator's electronic mail client, etc), notify the initiator of any newly detected electronic forms associated with a workflow, and then automatically add the electronic forms associated with a workflow to a determined destination aggregate package. Various operations performed by the system 200, according to an example embodiment, may be described with reference to FIG. 3.

Figure 3:
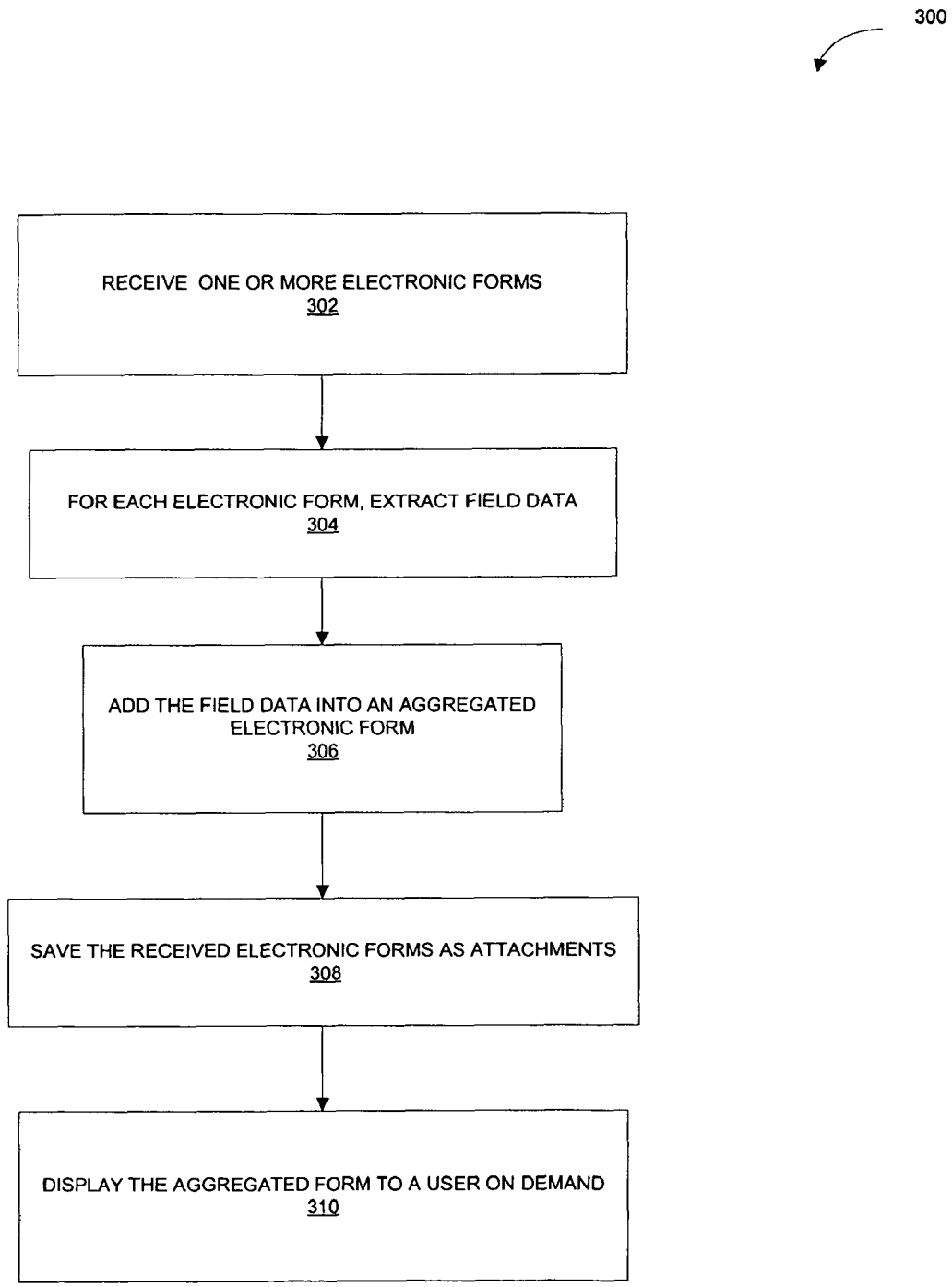
FIG. 3 is a flow chart illustrating a method to aggregate a set of collected electronic forms, in accordance with an example embodiment.

FIG. 3 is a flow chart illustrating a method 300 to aggregate a set of collected electronic forms, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both.

As shown in FIG. 3, the method 300 commences with the communications module 220 from FIG. 2 receiving one or more electronic forms at operation 302. At operation 304, the field data extractor 230 extracts the field data from the received electronic forms, and the aggregator 240 aggregates the extracted field data to generate an aggregated form at operation 306. The aggregator 240 may then pass control to the characterization module 250.

At operation 308, the characterization module 250 may save the received electronic forms as attachments associated wit the aggregated form. The resulting aggregated form (e.g., in an example embodiment of a summary sheet as discussed below) may be displayed to a user on demand, at operation 310. As mentioned above, the system 200 may include a detector 280 to detect automatically that an electronic form is part of a workflow. A method utilizing workflow metadata is discussed with reference to FIG. 4.

Figure 4:
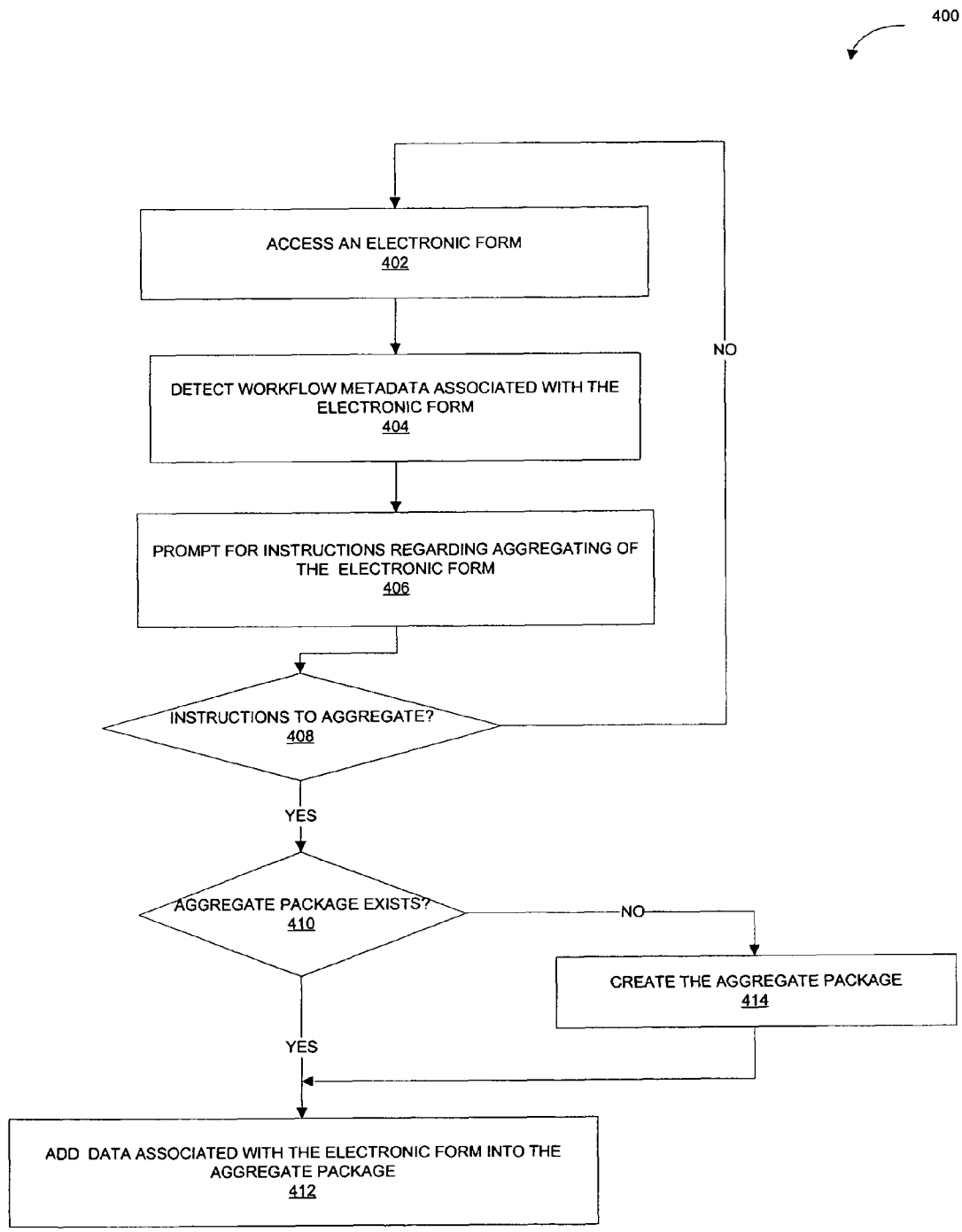
FIG. 4 is a flow chart illustrating a method to add data associated with an electronic form into an aggregate package utilizing workflow metadata, in accordance with an example embodiment.

FIG. 4 is a flow chart illustrating a method 400 to add data associated with an electronic form into an aggregate package utilizing workflow metadata, in accordance with an example embodiment. The method 400 may be performed by processing logic that may comprise hardware (e.g., dedicated logic, programmable logic, microcode, etc.), software (such as run on a general purpose computer system or a dedicated machine), or a combination of both. In one example embodiment, the method 400 may be performed by the various modules discussed above with reference to FIG. 2. Each of these modules may comprise processing logic.

As mentioned above, a form's workflow may include an initiator sending a blank form to multiple recipients and then receiving filled out versions of the form from those recipients. The original blank form may include metadata (e.g., workflow metadata) identifying instances of the original form as associated with a particular workflow and also identifying a destination aggregate package, should a form instance be aggregated into a dataset. The workflow metadata may be inserted into a form in response to an initiator requesting that the form is distributed to multiple recipients. Each received filled out form, in an example embodiment, may be an instance of an original blank form that was sent out.

When the filled out forms arrive, e.g., to the initiator's mail client inbox, a system for portable data aggregation (e.g., the system 200 of FIG. 2) may detect embedded workflow metadata and determine a potential destination for any data associated with the received forms. As shown in FIG. 4, the method 400 commences with the communications module 220 accessing an electronic form at operation 402. At operation 404, the detector 280 of FIG. 2 detects workflow metadata being present in the form. The detected metadata may also identify a destination, e.g., a target aggregate package, for data associated with the form. In one example embodiment, the system for portable data aggregation 200 may trigger a prompt requesting instructions regarding whether any data associated with the form is to be added into the target aggregate package (operation 406).

If it is determined, at operation 408, that the form data (e.g., the field data, the characterization of the form, or any other data associated with the form) is to be included in a target aggregate package, it is next determined, at operation 410, whether the target aggregate package already exists. If the target aggregate package does not exist, the target aggregate package is generated at operation 412. Otherwise, the method 400 proceeds to operation 414 to add data associated with the electronic form into the aggregated package.

An example original form that may be processed utilizing methods 300 and 400 is discussed with reference to FIG. 5.

Figure 5:
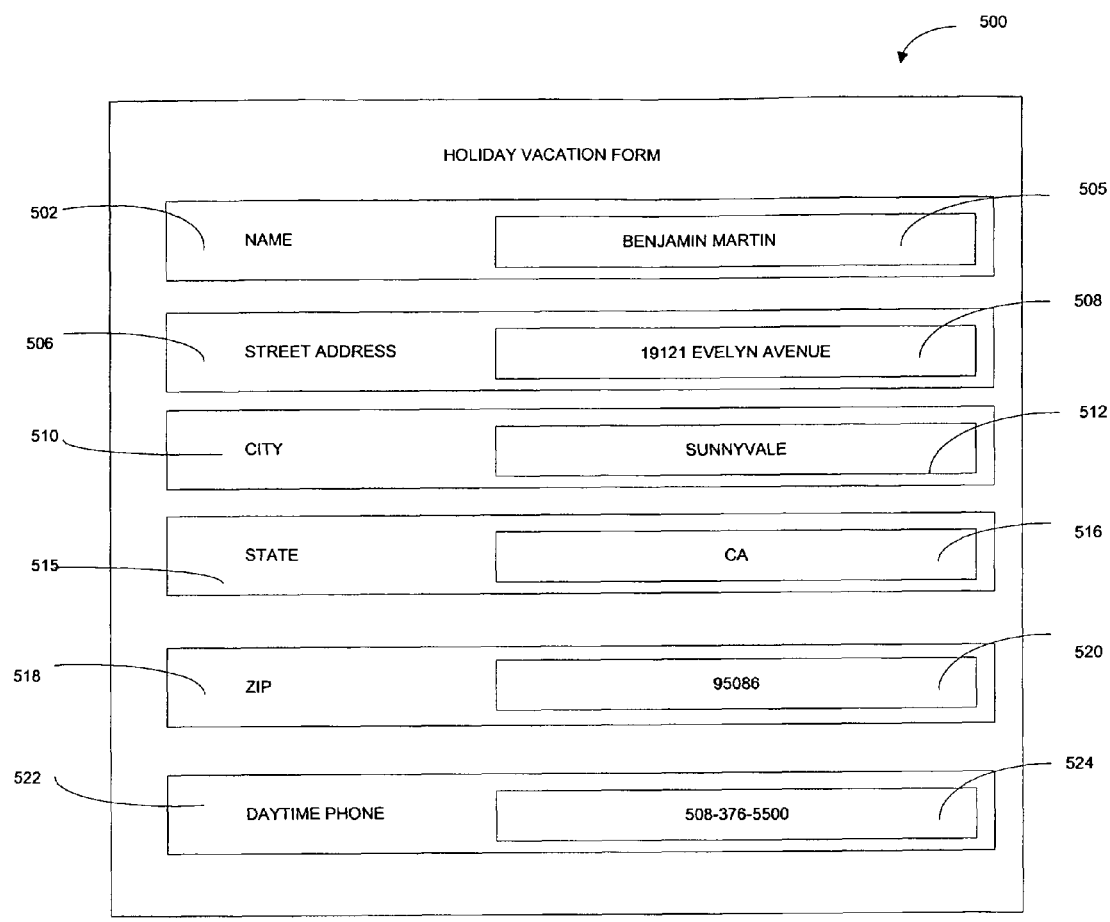
FIG. 5 illustrates an original electronic form, in accordance with an example embodiment.

FIG. 5 illustrates an original electronic form 500, in accordance with an example embodiment. The electronic form 500, entitled "Holiday Vacation Form," comprises a plurality of data fields that may receive field values in response to a user input. In the example "Holiday Vacation Form" 500, a "Name" field 502 has an associated field value "Benjamin Martin" 504. A "Street Address" field 506 has an associated field value "19121 Evelyn Avenue" 508. A "City" field 510 has an associated field value "Sunnyvale" 512. A "ZIP" field 514 has an associated field value "94086" 520. Finally, a "Daytime Phone" field 522 has an associated field value "408-376-5400" 524.

As mentioned above, an electronic form, e.g., the "Holiday Vacation Form" 500, may have embedded metadata such that an instance of the form may be identified by the system as part of a workflow. In an example embodiment, if an electronic form is identified by the system as part of a specific workflow, the system may selectively (e.g., after prompting a user for instructions regarding aggregating) add the electronic form data into an aggregate package, e.g., as shown in FIG. 6.

An example summary sheet 600 is illustrated in FIG. 6. As shown in FIG. 6, the field values from the "Holiday Vacation Form" 500 appear in a single row 610 of the summary sheet 600. A catalog identification associated with each of the electronic forms aggregated into the summary sheet 600 may be provided in an "ID" column 620.

It will be noted that, although some example embodiments of the invention have been described in the context of PDF electronic forms, the techniques herein may be utilized advantageously with a variety of data presentation formats that are suitable for providing electronic forms to users. In one example embodiment, an aggregate package may be implemented as an extensible Markup Language (XML) file.

As discussed above, the system to aggregate a set of collected electronic forms into an aggregate package may receive electronic forms from users who filled out a distributed form. In one example embodiment, the system may be configured to receive just field data associated with a filled out electronic form (e.g. in the XML format), as opposed to the whole completed form (e.g. a PDF file). The returned XML file may then be associated with an appropriate aggregate package. The XML data may be included, in one embodiment, into the aggregate package as one of the records in the tabulated view. When the system detects a user's request to display a complete form for that particular record, the system may open a copy of a blank form, import the XML data into the blank form, and display the resulting form to the user.

Figure 7:
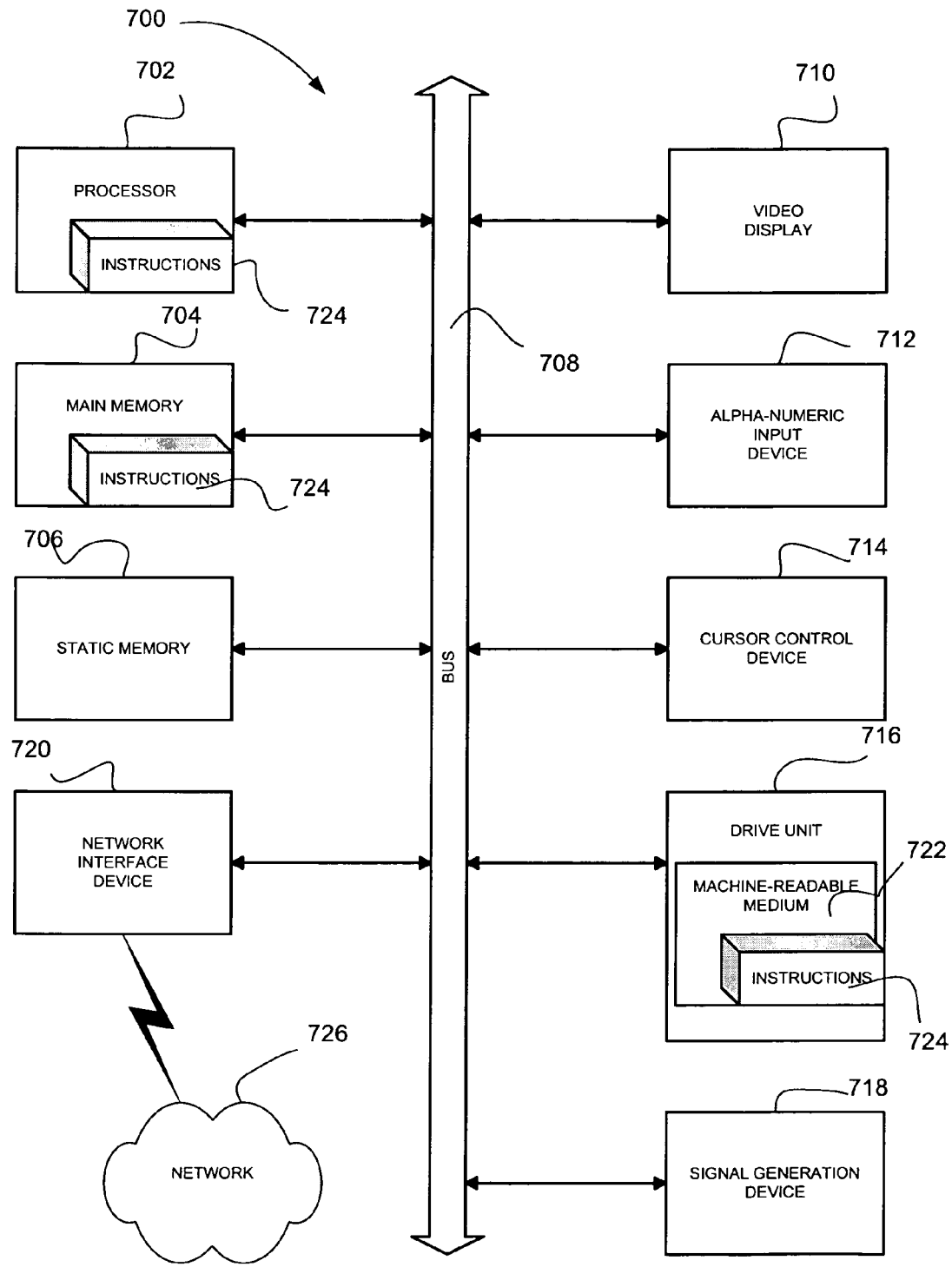
FIG. 7 illustrates a diagrammatic representation of a machine in the example form of a computer system within which a set of instructions, for causing the machine to perform any one or more of the methodologies discussed herein, may be executed.

FIG. 7 shows a diagrammatic representation of a machine in the example electronic form of a computer system 700 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an "Moving Picture Experts Group (MPEG) Layer 3" (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a user interface (UI) navigation device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing a set of instructions for execution by the machine and that cause the machine to perform any one or more of the methodologies of the present invention, or that is capable of storing data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Thus, a method and system for portable data aggregation have been described. Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
   a processor; and
   a memory coupled to the processor, the processor implementing:
      a communications module to receive an electronic form comprising field data;
      a detector to detect a workflow identifier associated with the electronic form, the workflow identifier indicating that the electronic form is from a plurality of workflow electronic forms and that the electronic form is to be included as a new record in an aggregate package, the aggregate package to store field data associated with each of the plurality of workflow electronic forms as a respective separate record, the plurality of the workflow electronic forms comprising field data of different respective users;
      an aggregator to add the field data present in the received electronic form as the new record into the aggregate package in response to the detected workflow identifier; and
      a presenter to present data associated with the plurality of users stored in the aggregate package as an electronic summary sheet.

2. The system of claim 1, wherein the detector is to scan periodically a file storage location for the indication.

3. The system of claim 1, wherein the detector is to request instructions regarding associating the field data with the aggregate package in response to the detected indication.

4. The system of claim 1, wherein the aggregator is to:
   generate the aggregate package in response to the detecting of the indication and responsive to a determination that the aggregate package does not exist.

5. The system of claim 1, wherein the aggregator is to generate a catalog identification for the electronic form, the catalog identification to identify the electronic form associated with the field data in the aggregate package.

6. The system of claim 1, wherein the aggregate package is an eXtensible Markup Language (XML) data file.

7. The system of claim 1, wherein the aggregate package comprises a plurality of files.

8. The system of claim 1, further comprising a characterization module to associate a characterization of the electronic form with the aggregate package to preserve visual presentation of the electronic form.

9. The system of claim 8, further comprising a responder to:
   receive a control action associated with the separate record; and
   display a representation of the electronic form in response to the control action utilizing the characterization of the electronic form.

10. The system of claim 9, wherein the control action is clicking on the separate record.

11. The system of claim 9, further comprising a remover to:
   receive a remove control action associated with the separate record; and
   remove the field data and the characterization of the electronic form from the aggregate package in response to the remove control action.

12. The system of claim 1, wherein the electronic form is in a Portable Document Format (PDF).

13. The system of claim 1, wherein the indication comprises workflow metadata associated with the electronic form.

14. A method comprising:
   using a processor to perform the operations of:
      receiving an electronic form comprising field data;
      detecting a workflow identifier associated with the electronic form indicating that the electronic form is from a plurality of workflow electronic forms and that the electronic form is to be included as a new record in an aggregate package for storing data associated with a plurality of users, the aggregate package to store data associated with each of the plurality of workflow electronic forms as a respective separate record, the plurality of the workflow electronic forms comprising field data of different respective users;
      adding the field data associated with the electronic form as the new record into the aggregate package in response to the detecting of the workflow identifier; and
      presenting the data associated with the electronic form in the aggregate package as an aggregate representation of the field data.

15. The method of claim 14, wherein the detecting of the workflow indication comprises scanning periodically a file storage location for the indication.

16. The method of claim 14, further comprising requesting instructions regarding associating the data associated with the electronic form with the aggregate package in response to the detecting of the workflow indication.

17. The method of claim 14, wherein the associating of the data associated with the electronic form with an aggregate package comprises:
   determining that the aggregate package does not exist; and
   generating the aggregate package.

18. The method of claim 14, wherein the associating of the data associated with the electronic form with an aggregate package comprises generating a catalog identification for the electronic form, the catalog identification to identify the data associated with the electronic form in the aggregate package.

19. The method of claim 14, wherein the adding of the data associated with the electronic form into an aggregate package comprises associating characterization of the electronic form with the aggregate package to preserve visual presentation of the electronic form.

20. The method of claim 19, further comprising:
   receiving a control action associated with an aggregate representation of the data associated with the electronic form in the aggregate package; and
   displaying a representation of the electronic form in response to the control action utilizing the characterization of the electronic form.

21. The method of claim 14, wherein the workflow indication comprises metadata associated with the electronic form.

22. A machine-readable medium having instruction data to cause a machine to:
   detect workflow metadata associated with an electronic form, the electronic form comprising field data;
   receive confirmation that the electronic form is to be associated with an aggregate package for storing data associated with a plurality of users, the aggregate package to store field data associated with a plurality of workflow electronic forms as respective separate records, the plurality of the workflow electronic forms comprising field data of different respective users; and
   add the field data with the aggregate package in response to the confirmation, the field data associated being presented in the aggregate package as a separate record.

* * * * *